United States Patent
Wang

(10) Patent No.: US 9,974,136 B1
(45) Date of Patent: May 15, 2018

(54) LED AUTOMOBILE HEADLIGHT WITH SWITCHABLE DUAL-COLOR TEMPERATURE

(71) Applicant: Shitao Wang, Guangzhou (CN)

(72) Inventor: Shitao Wang, Guangzhou (CN)

(73) Assignee: Guangzhou Wangyi Trade Co., Ltd., Guangzhou (CN)

( * ) Notice: Subject to any disclaimer, the term of this patent is extended or adjusted under 35 U.S.C. 154(b) by 0 days. days.

(21) Appl. No.: 15/438,081

(22) Filed: Feb. 21, 2017

(30) Foreign Application Priority Data

Jan. 9, 2017 (CN) .......................... 2017 1 0014219

(51) Int. Cl.
*B60Q 1/02* (2006.01)
*H05B 33/08* (2006.01)
*B60Q 1/00* (2006.01)
*B60Q 1/14* (2006.01)

(52) U.S. Cl.
CPC ....... *H05B 33/0857* (2013.01); *B60Q 1/0076* (2013.01); *B60Q 1/1407* (2013.01); *H05B 33/0809* (2013.01); *B60Q 2400/20* (2013.01)

(58) Field of Classification Search
CPC ..... F21V 23/02; F21V 25/12; H05B 37/0236; A63J 17/00; F21L 14/026; B60Q 3/0293; B60Q 11/005; B60Q 1/387; B60Q 1/2603; B60Q 3/048; B60Q 1/44; B60Q 1/143; B60Q 1/1423; B60Q 9/001; B60Q 2300/112; B60R 16/03; H02K 21/48; B62J 6/001; B62J 6/003; H02J 7/1492
See application file for complete search history.

(56) References Cited

U.S. PATENT DOCUMENTS

| | | | | |
|---|---|---|---|---|
| 2013/0258688 | A1* | 10/2013 | Kalapodas | B60Q 1/085 362/465 |
| 2015/0198292 | A1* | 7/2015 | Jones | F21S 8/088 362/545 |
| 2015/0321598 | A1* | 11/2015 | Kanayama | F21S 48/1104 362/487 |
| 2015/0323147 | A1* | 11/2015 | Kanayama | F21S 48/1216 362/487 |
| 2017/0158113 | A1* | 6/2017 | Kanayama | B60Q 1/085 |

* cited by examiner

*Primary Examiner* — Minh D A
(74) *Attorney, Agent, or Firm* — Weisun Rao; Dennis P. Malloy; Greenberg Traurig, LLP

(57) ABSTRACT

The present invention relates to an LED automobile headlight with switchable dual-color temperature including a headlight body, a high-beam and low-beam switch and an LED driving device. The LED driving device includes: a control circuit module, configured to receive the high-beam signal or the low-beam signal, and output a control signal to control a driving circuit module; and the driving circuit module, configured to drive a white-light high-beam LED lamp, a yellow-light high-beam LED lamp, a white-light low-beam LED lamp or a yellow-light low-beam LED lamp to operate, based on the control signal.

6 Claims, 4 Drawing Sheets

LED AUTOMOBILE HEADLIGHT WITH SWITCHABLE DUAL-COLOR TEMPERATURE

CROSS-REFERENCE TO RELATED APPLICATION

This application claims priority to Chinese Patent Application No. 201710014219.0, filed on Jan. 9, 2017, the contents of which are incorporated herein in their entirety.

FIELD OF THE INVENTION

The present invention relates generally to the field of control technology, and more particularly, to an LED automobile headlight with switchable dual-color temperature, which is applied to vehicle lighting.

BACKGROUND OF THE INVENTION

Traditional LED automobile headlights generally use light sources with a single color temperature, for example, with yellow light of 3000K-3500K, or with white light of 6000K-6500K (which is more popular). Each light source has its own advantages and disadvantages. The white light has a relatively high illuminance and better lighting performance in normal weather and road conditions, and is more popular to young people. The yellow light has good penetration ability due to its short-wavelength, and can maintain relatively high lighting effect in harsh weather conditions, such as in rain, fog and snow. Based on the different properties of the light sources with one of the above two color temperatures, there are many automobile headlight products with both the two color temperatures on the market, as well as color-change films or coatings capable of changing the color temperature of the headlight, but for such goods. However, the operation of switching between the two color temperatures is very complicated, inconvenient and time-consuming.

SUMMARY OF THE INVENTION

It is an objective of the present invention to provide an LED automobile headlight with switchable dual-color temperature, which can conveniently and quickly switch between a yellow light and a white light for illumination.

In order to achieve the above object, an LED automobile headlight with switchable dual-color temperature is provided, including: a headlight body; a high-beam and low-beam switch, mounted inside a driving cab, and configured to be switched to output a high-beam signal or a low-beam signal; and an LED driving device, configured to drive the automobile headlight, the LED driving device including: a control circuit module, configured to receive the high-beam signal or the low-beam signal, and output a control signal to control a driving circuit module; and the driving circuit module, configured to drive a white-light high-beam LED lamp, a yellow-light high-beam LED lamp, a white-light low-beam LED lamp or a yellow-light low-beam LED lamp to operate, based on the control signal.

The present invention has the following advantages. A low color temperature LED light source (a yellow light of 3000K-3500K) is added to the LED light source plate of the automobile headlight, and a switch function (the control circuit module and driving circuit module) under the control of a single chip microcomputer is added to the LED driving power supply. In this way, the driver only needs to adjust in the driving cabin a headlight switch to switch between two lights of different color temperatures, which is convenient, rapid, simple in operation, without influencing the lighting effect. In addition, it does not require opening the hood to install or replace any device to change the color temperature of the light source. With the help of quick switching between the white light and the yellow light for illumination, the driver can conveniently and quickly select a light source with an appropriate color temperature for road lighting, for different weather and road conditions, which is convenient in operation.

Further, it further includes a step-down circuit based on a three-terminal voltage-regulator diode, configured to drop a vehicular voltage of 12V to a voltage of 5V to drive the control circuit module.

The above further solution has the following beneficial effect. A three-terminal voltage-regulator diode, for example, the type 78L05, may be used to convert a vehicular power of 12V to a DC power of 5V to drive the control circuit module, which is simple in structure, and stable and reliable in performance.

Further, the control circuit module includes a main-control chip of the type HD8008, the main-control chip having a high-beam control terminal coupled to the high-beam and low-beam switch to receive a high-beam input signal; a low-beam control terminal is coupled to the high-beam and low-beam switch to receive a low-beam input signal, and four control output terminals coupled to the driving circuit module respectively, to drive the white-light high-beam LED lamp, the yellow-light high-beam LED lamp, the white-light low-beam LED lamp or the yellow-light low-beam LED lamp to operate.

The above further solution has the following beneficial effect. The HD8008 main-control chip can receive the high-beam signal or the low-beam signal, and switch the operations of the white-light high-beam LED lamp, the yellow-light high-beam LED lamp, the white-light low-beam LED lamp or the yellow-light low-beam LED lamp based on the high-beam signal or the low-beam signal. The main-control chip has a memory feature, which is convenient to drive and switch illumination.

Further, the driving circuit module includes a rectification circuit including first to sixth diodes, in which a positive electrode of the first diode is coupled to a positive electrode of a high-beam voltage, a negative electrode of the first diode is coupled to a power supply terminal VDD of a step-down LED constant current driver after coupled in series with a third resistor, the positive electrode of the high-beam voltage is further coupled to a positive electrode of the second diode after coupled in series with a second resistor, a negative electrode of the second diode is coupled to the negative electrode of the first diode, the positive electrode of the second diode is further coupled to a positive electrode of the third diode after coupled in series with a first resistor, and a negative electrode of the third diode is coupled to the a negative electrode of the first diode.

A excitation output terminal DRV of the step-down LED constant current driver is coupled to a gate electrode of an NOMS transistor, a chip selection terminal CS for the NMOS transistor is coupled to a source electrode of the NOMS transistor, an inductor in series with drain electrode of the NMOS transistor is couple to negative electrodes of the white-light high-beam LED lamp, the yellow-light high-beam LED lamp, the white-light low-beam LED lamp and the yellow-light low-beam LED lamp respectively after coupled in series with an inductor, and each of the negative electrodes of the white-light high-beam LED lamp, the yellow-light high-beam LED lamp, the white-light low-beam LED lamp and the yellow-light low-beam LED lamp is coupled to one LED lamp driving circuit respectively.

The above further solution has the following beneficial effect. The rectification circuit is simple in structure, and stable and reliable in performance. The step-down LED constant current driver can drop the voltage of the signal from the rectification circuit to drive the NMOS transistor which acts as a voltage switch. When the LED lamp driving circuit drives an LED lamp, the source electrode and the drain electrode of the NMOS transistor are conducted. In the circuit configuration, it is simple in structure, and stable and reliable in performance.

Further, the LED lamp driving circuit includes a triode having a base electrode coupled to a control output terminal of the main-control chip, an emitter electrode grounded, and a collector electrode coupled to a gate electrode of a PMOS transistor, the PMOS transistor having a source electrode coupled to the negative electrode of the first diode, and a drain electrode coupled to a positive electrode of the white-light high-beam LED lamp, the yellow-light high-beam LED lamp, the white-light low-beam LED lamp or the yellow-light low-beam LED lamp.

The above further solution has the following beneficial effect. There are four LED lamp driving circuits, and each LED lamp driving circuit drives one LED lamp. The driving circuit is simple in structure, low in cost and reliable in performance.

Further, a voltage input terminal of the three-terminal voltage-regulator diode is coupled to the negative electrode of the first diode.

The above further solution has the following beneficial effect. The three-terminal voltage-regulator diode can use a voltage rectified by the rectification circuit, and such circuit is simple in structure.

DETAILED DESCRIPTION OF THE INVENTION

In the following description of embodiments, reference is made to the accompanying drawings which form a part hereof, and in which it is shown by way of illustration specific embodiments of the invention that can be practiced. It is to be understood that other embodiments can be used and structural changes can be made without departing from the scope of the disclosed embodiments.

Figure 1:
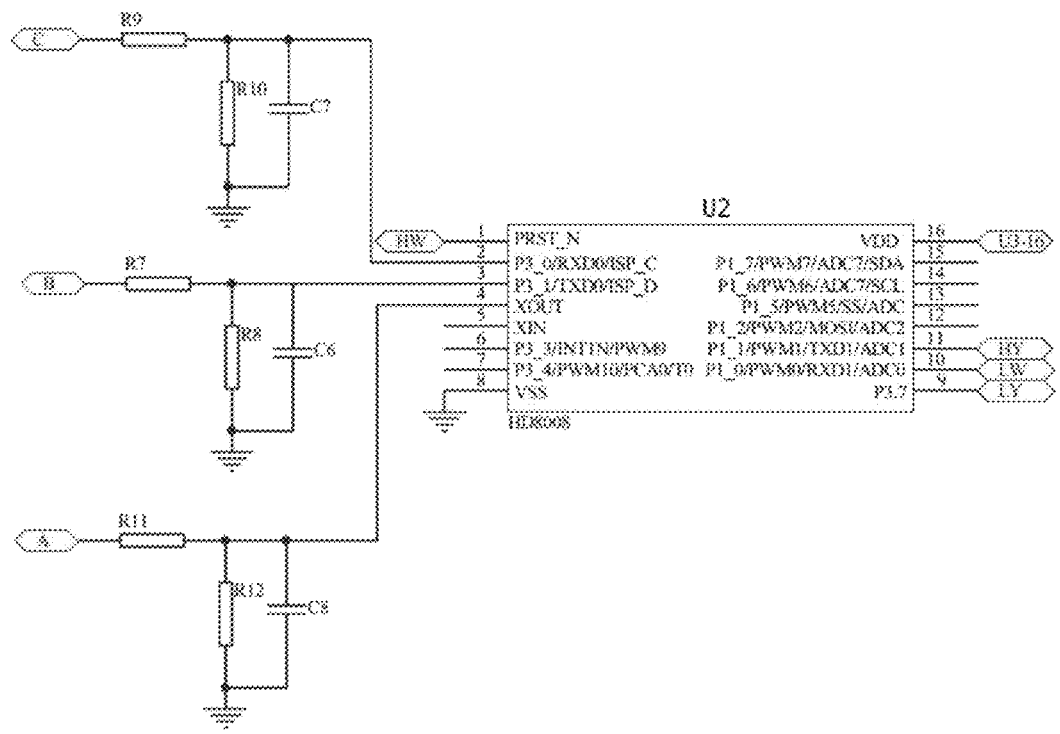
FIG. 1 is a schematic circuit diagram illustrating a control circuit module according to one embodiment of the present invention.
Figure 2:
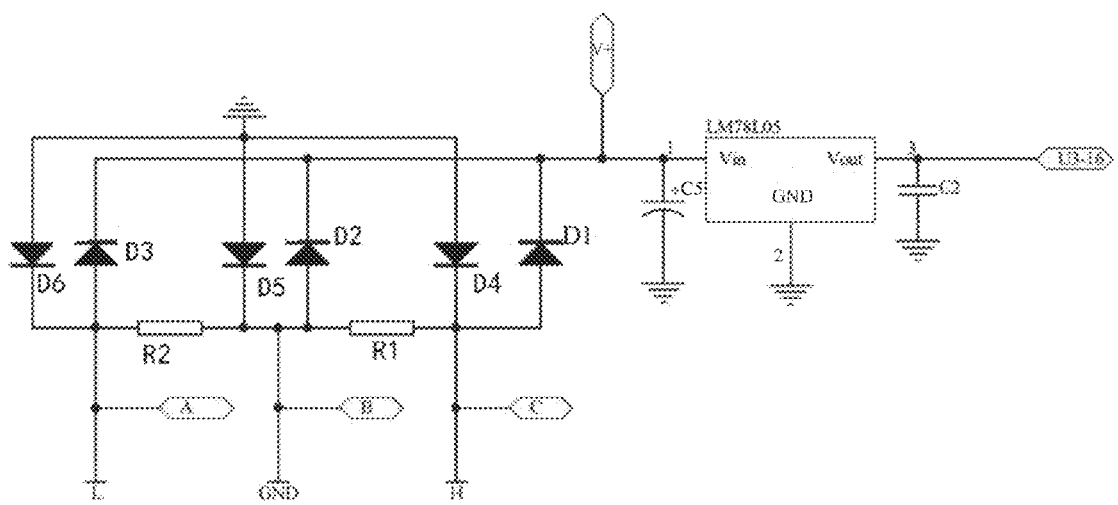
FIG. 2 is a schematic circuit diagram illustrating a rectification circuit and a step-down circuit according to one embodiment of the present invention.
Figure 3:
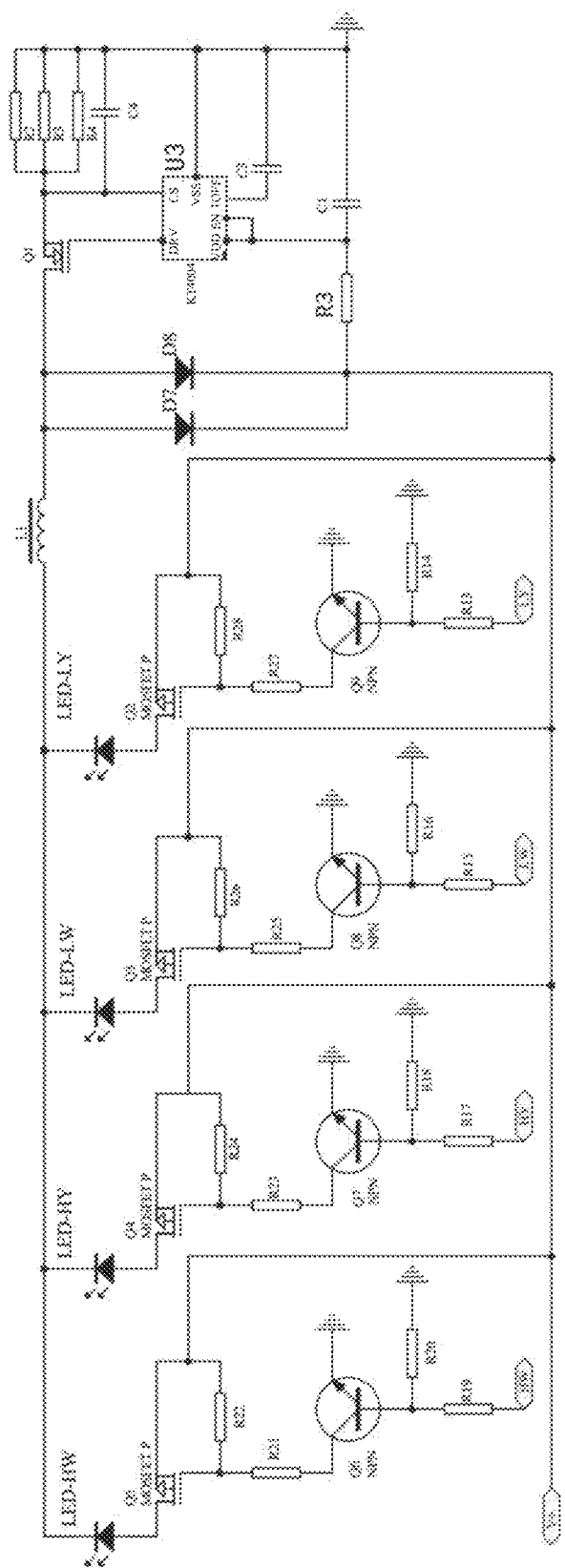
FIG. 3 is a schematic circuit diagram illustrating a driving circuit module according to one embodiment of the present invention.

As shown in FIGS. 1-3, an LED automobile headlight with switchable dual-color temperature includes a headlight body and a high-beam and low-beam switch, mounted inside a driving cab, and configured to be switched to output a high-beam signal or a low-beam signal. The high-beam and low-beam switch may directly use the current high-beam and low-beam switch, with no additional component.

The LED automobile headlight with switchable dual-color temperature further includes an LED driving device, mounted on the vehicle, and configured to drive the automobile headlight.

The LED driving device includes:
a control circuit module, configured to receive the high-beam signal or the low-beam signal, and output a control signal to control a driving circuit module; and
the driving circuit module, configured to drive a white-light high-beam LED lamp, a yellow-light high-beam LED lamp, a white-light low-beam LED lamp or a yellow-light low-beam LED lamp to operate, based on the control signal.

The LED automobile headlight with switchable dual-color temperature further includes a step-down circuit based on a three-terminal voltage-regulator diode U1, configured to drop a vehicular voltage of 12V to a voltage of 5V to drive the control circuit module.

The control circuit module includes a main-control chip U2 of the type HD8008, the main-control chip U2 having a high-beam control terminal coupled to the high-beam and low-beam switch to receive a high-beam input signal; a low-beam control terminal is coupled to the high-beam and low-beam switch to receive a low-beam input signal, and four control output terminals coupled to the driving circuit module respectively, to drive the white-light high-beam LED lamp, the yellow-light high-beam LED lamp, the white-light low-beam LED lamp or the yellow-light low-beam LED lamp to operate.

The driving circuit module includes a rectification circuit including first to sixth diodes D1-D6. A positive electrode of the first diode D1 is coupled to a positive electrode of a high-beam voltage, a negative electrode of the first diode D1 is coupled to a power supply terminal VDD of a step-down LED constant current driver U3 after coupled in series with a third resistor R3, the positive electrode of the high-beam voltage is further coupled to a positive electrode of the second diode D2 after coupled in series with a second resistor R2, a negative electrode of the second diode D2 is coupled to the negative electrode of the first diode D1, the positive electrode of the second diode D2 is further coupled to a positive electrode of the third diode D3 after coupled in series with a first resistor R1, and a negative electrode of the third diode D3 is coupled to the a negative electrode of the first diode D1.

A excitation output terminal DRV of the step-down LED constant current driver U3 is coupled to a gate electrode of an NOMS transistor, a chip selection terminal CS for the NMOS transistor is coupled to a source electrode of the NOMS transistor, an inductor L in series with drain electrode of the NMOS transistor is couple to negative electrodes of the white-light high-beam LED lamp, the yellow-light high-beam LED lamp, the white-light low-beam LED lamp and the yellow-light low-beam LED lamp respectively after coupled in series with an inductor L, and each of the negative electrodes of the white-light high-beam LED lamp, the yellow-light high-beam LED lamp, the white-light low-beam LED lamp and the yellow-light low-beam LED lamp is coupled to one LED lamp driving circuit respectively. The LED lamp driving circuit includes a triode having a base electrode coupled to a control output terminal of the main-control chip, an emitter electrode grounded, and a collector electrode coupled to a gate electrode of a PMOS transistor, the PMOS transistor having a source electrode coupled to the negative electrode of the first diode (D1), and a drain electrode coupled to a positive electrode of the white-light high-beam LED lamp, the yellow-light high-beam LED lamp, the white-light low-beam LED lamp or the yellow-light low-beam LED lamp.

Principles of Electric Circuits

Figure 4:
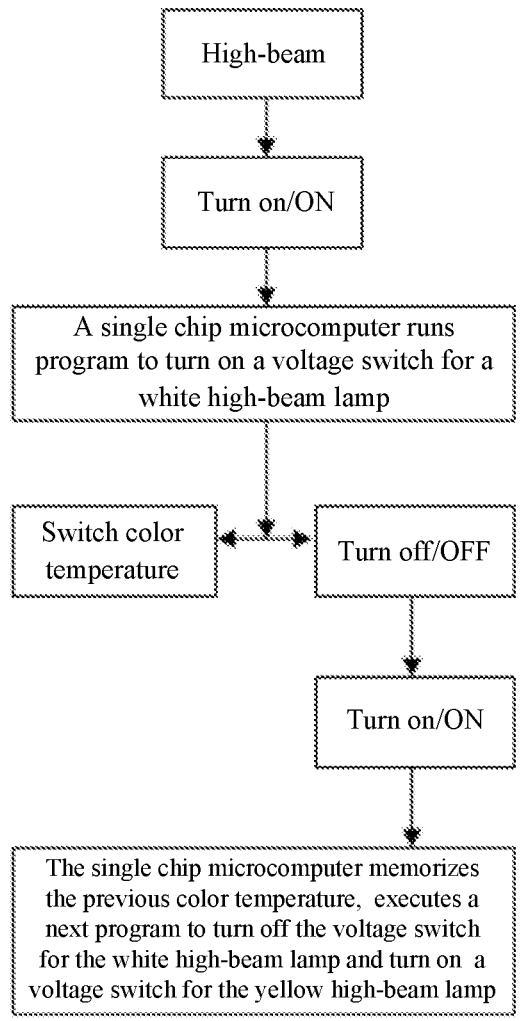
FIG. 4 is a flow diagram illustrating processes of high-beam switching according to one embodiment of the present invention.

When the driver turns on the high-beam switch, the vehicle power supply of 12V may flow through the rectification circuit to output a driving voltage. The 12V voltage may be input into the input terminal Vin of the three-terminal voltage-regulator diode U1. The output terminal Vout of the three-terminal voltage-regulator diode U1 output a 5V DC power to drive the main-control chip U2. The main-control chip U2 may activate a corresponding LED lamp driving circuit to drive an LED lamp, based on the input high-beam signal. A program of the main-control chip U2 may run. A terminal corresponding to the white high-beam lamp may output a high level to turn on the triode, so that the gate electrode G of the NMOS gets a voltage of 6V to conduct the drain electrode D and the source electrode S. A voltage may pass through the LED to form a circuit loop with the driving circuit, and the LED (white high-beam lamp) may obtain current to be lighted up. When the high-beam switch is turned off, the single chip microcomputer (main controller) may know the instruction executed in the previous step, due to the memory feature of the single chip microcomputer. When the driver turns on the high-beam switch again, the single chip microcomputer may run program to change the output terminal. A terminal corresponding to the yellow high-beam lamp may output a high level to turn on the triode, so that the gate electrode G of the NMOS gets a voltage of 6V to conduct the drain electrode and the source electrode. A voltage may pass through the LED to form a circuit loop with the driving circuit, and the yellow high-beam lamp may be lighted up (as shown in FIG. 4).

Figure 5:
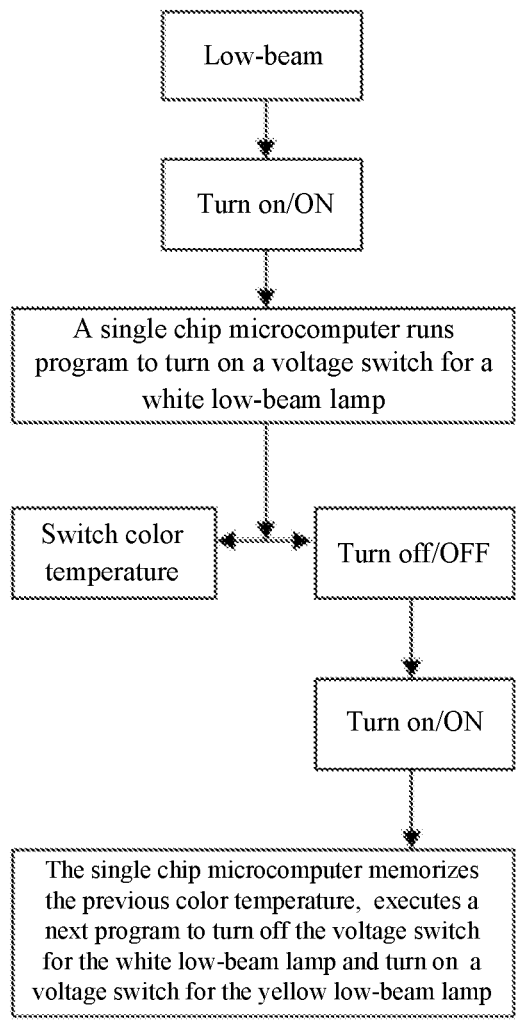
FIG. 5 is a flow diagram illustrating processes of low-beam switching according to one embodiment of the present invention.

The switching of the low-beam lamp (as shown in FIG. 5) is similar to the above processes, and will not be explained here.

The embodiments are chosen and described in order to explain the principles of the invention and their practical application so as to activate others skilled in the art to utilize the invention and various embodiments. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An LED automobile headlight with switchable dual-color temperature, comprising:
  a headlight body;
  a high-beam and low-beam switch, mounted inside a driving cab, and configured to be switched to output a high-beam signal or a low-beam signal; and
  an LED driving device, configured to drive the automobile headlight, the LED driving device including:
    a control circuit module, configured to receive the high-beam signal or the low-beam signal, and output a control signal to control a driving circuit module; and
    the driving circuit module, configured to drive a white-light high-beam LED lamp, a yellow-light high-beam LED lamp, a white-light low-beam LED lamp or a yellow-light low-beam LED lamp to operate, based on the control signal; and
    a step-down circuit based on a three-terminal voltage-regulator diode, configured to drop a vehicular voltage of 12V to a voltage of 5V to drive the control circuit module.

2. The LED automobile headlight with switchable dual-color temperature of claim 1 wherein a voltage input terminal of the three-terminal voltage-regulator diode (U1) is coupled to the negative electrode of the first diode.

3. An LED automobile headlight with switchable dual-color temperature, comprising:
  a headlight body;
  a high-beam and low-beam switch, mounted inside a driving cab, and configured to be switched to output a high-beam signal or a low-beam signal; and
  an LED driving device, configured to drive the automobile headlight, the LED driving device including:
    a control circuit module, configured to receive the high-beam signal or the low-beam signal, and output a control signal to control a driving circuit module; and
    the driving circuit module, configured to drive a white-light high-beam LED lamp, a yellow-light high-beam LED lamp, a white-light low-beam LED lamp or a yellow-light low-beam LED lamp to operate, based on the control signal; and
    wherein the control circuit module includes a main-control chip of the type HD8008, the main-control chip having a high-beam control terminal coupled to the high-beam and low-beam switch to receive a high-beam input signal, a low-beam control terminal coupled to the high-beam and low-beam switch to receive a low-beam input signal, and four control output terminals coupled respectively to the driving circuit module to drive the white-light high-beam LED lamp, the yellow-light high-beam LED lamp, the white-light low-beam LED lamp or the yellow-light low-beam LED lamp to operate.

4. An LED automobile headlight with switchable dual-color temperature, comprising:
  a headlight body;
  a high-beam and low-beam switch, mounted inside a driving cab, and configured to be switched to output a high-beam signal or a low-beam signal; and
  an LED driving device, configured to drive the automobile headlight, the LED driving device including:
    a control circuit module, configured to receive the high-beam signal or the low-beam signal, and output a control signal to control a driving circuit module; and
    the driving circuit module, configured to drive a white-light high-beam LED lamp, a yellow-light high-beam LED lamp, a white-light low-beam LED lamp or a yellow-light low-beam LED lamp to operate, based on the control signal; and
    wherein the driving circuit module includes a rectification circuit including first to sixth diodes, a positive electrode of the first diode is coupled to a positive electrode of a high-beam voltage, a negative electrode of the first diode is coupled to a power supply terminal of a step-down LED constant current driver after coupled in series with a third resistor,
  the positive electrode of the high-beam voltage is further coupled to a positive electrode of the second diode after coupled in series with a second resistor, a negative electrode of the second diode is coupled to the negative electrode of the first diode, the positive electrode of the second diode is further coupled to a positive electrode of the third diode after coupled in series with a first resistor, and a negative electrode of the third diode is coupled to the a negative electrode of the first diode; and an excitation output terminal of the step-down LED constant current driver is coupled to a gate electrode of a NOMS transistor, a chip selection terminal for the NMOS transistor is coupled to a source electrode of the NOMS transistor, an inductor in series with drain electrode of the NMOS transistor is couple to negative electrodes of the white-light high-beam LED lamp, the yellow-light high-beam LED lamp, the white-light low-beam LED lamp and the yellow-light low-beam LED lamp respectively after coupled in series with an inductor, and each of the negative electrodes of the white-light high-beam LED lamp, the yellow-light high-beam LED lamp, the white-light low-beam LED lamp and the yellow-light low-beam LED lamp is coupled to one LED lamp driving circuit respectively.

5. The LED automobile headlight with switchable dual-color temperature of claim 4 wherein the LED lamp driving circuit includes a triode having a base electrode coupled to a control output terminal of the main-control chip, an emitter electrode grounded, and a collector electrode coupled to a gate electrode of a PMOS transistor, the PMOS transistor having a source electrode coupled to the negative electrode of the first diode, and a drain electrode coupled to a positive electrode of the white-light high-beam LED lamp, the yellow-light high-beam LED lamp, the white-light low-beam LED lamp or the yellow-light low-beam LED lamp.

6. The LED automobile headlight with switchable dual-color temperature of claim 4 wherein a voltage input terminal of the three-terminal voltage-regulator diode is coupled to the negative electrode of the first diode.

* * * * *